No. 652,397. Patented June 26, 1900.
A., J. & G. LYONS.
MEANS FOR PACKING EGGS.
(Application filed Dec. 5, 1899.)
(No Model.)
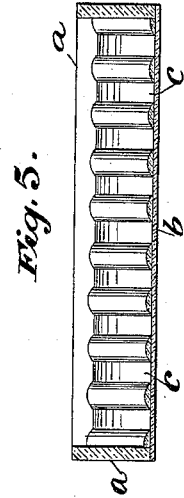
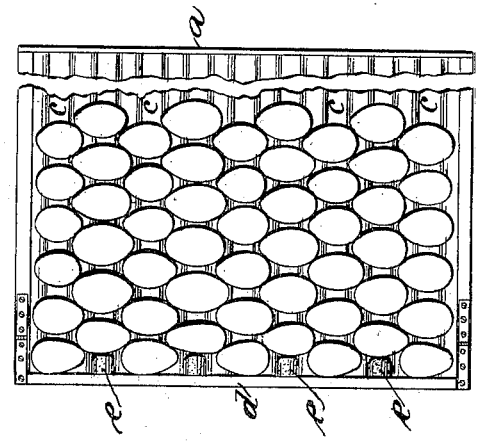
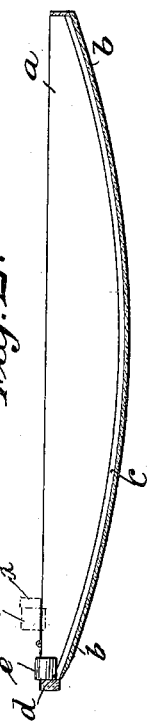
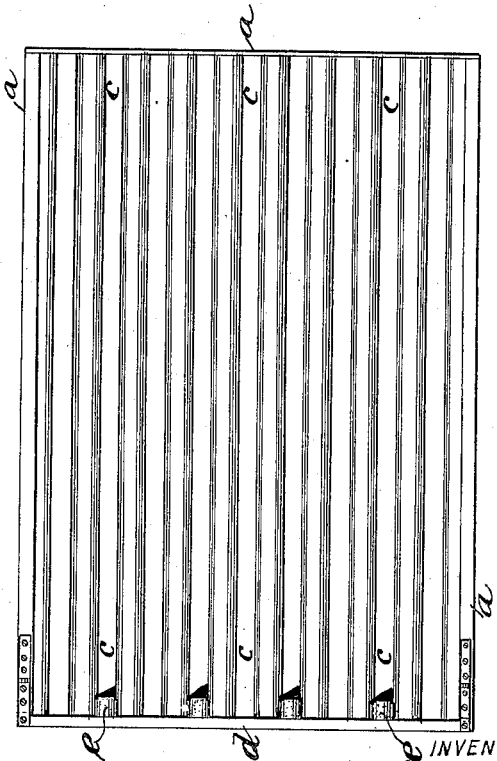
WITNESSES:
INVENTORS.
ATTORNEYS

UNITED STATES PATENT OFFICE.

ALFRED LYONS, JAMES LYONS, AND GEORGE LYONS, OF MANCHESTER, ENGLAND.

MEANS FOR PACKING EGGS.

SPECIFICATION forming part of Letters Patent No. 652,397, dated June 26, 1900.

Application filed December 5, 1899. Serial No. 739,274. (No model.)

*To all whom it may concern:*

Be it known that we, ALFRED LYONS, JAMES LYONS, and GEORGE LYONS, subjects of the Queen of Great Britain, residing at Manchester, in the county of Lancaster, England, (whose post-office address is 18 and 20 Oak street, Manchester,) have invented new and useful Improvements in and Connected with Means for Packing Eggs, (for which we have made application for Letters Patent in Great Britain, No. 9,860, dated May 10, 1899; in Germany, No. 13,275, (serial,) dated June 16, 1899; in Austria dated June 14, 1899; in Hungary dated June 17, 1899; in Russia dated July 12, 1899; in Canada dated June 27, 1899; in France dated November 4, 1899; in Belgium dated November 4, 1899, and in Denmark dated November 6, 1899,) of which the following is a specification.

Hitherto eggs have been packed into cases or crates by rolling the same from trays on which they are piled into the case or crate and afterward spreading same out in even layers or by placing the eggs by hand, two by two, into the case or crate, so as to interlock. This method of packing eggs on the whole is very laborious, and in rolling same off the tray into the case or crate a great many eggs break and the space is not utilized to advantage.

The object of this invention is to provide a form of tray whereby the said disadvantages are overcome—that is to say, whereby the packing of eggs into cases or crates is greatly accelerated, breakages of eggs minimized, and the whole of the available space utilized. We attain this object by the means illustrated in the accompanying drawings, in which—

Figure 1 is a side view, Fig. 2 a longitudinal section, Fig. 3 a plan, Fig. 4 an end view, and Fig. 5 a cross-section, of an empty tray constructed in accordance with our invention; and Fig. 6, a plan, shown partly filled with eggs.

Similar letters refer to similar parts throughout the several views.

In carrying out our invention and referring to the figures generally our improvements consist in forming a tray-like receptacle $a$, open at one end and having a grooved corrugated bottom $b$, the grooves or corrugations $c$ in the said bottom being of such a section and width that the eggs placed into the tray will take up their position side by side rowwise in the said grooves or corrugations and when reciprocating the tray slightly by hand will interlock with each other in uniform rows, as shown in Fig. 6. To the open end of the tray we may, however, hinge a rail $d$, adapted to close the respective end and to be swung back when required. (See dotted lines, Fig. 2.) This rail has projections $e$, which enter the ends of the grooves or corrugations $c$ in alternate order and are adapted to insure the eggs in the tray interlocking with each other more readily when tilting, rocking, or reciprocating the tray. The eggs are deposited into the case or crate by placing the open end against one end of the case or crate, lifting back the adjustable rail $d$, (when used,) and withdrawing the tray in a tilted position. The said grooved or corrugated tray-bottom may be formed straight, as shown in dotted lines, or curved, as shown in full lines, Fig. 1.

What we claim as our invention, and desire to secure by Letters Patent, is—

1. A receptacle for adjusting eggs side by side rowwise so as to interlock, comprising a tray having two sides and one end closed and a bottom formed with grooves longitudinally to the said sides, adapted to carry eggs crosswise and discharge them sidewise through the open end of the said tray, all substantially as described.

2. A receptacle for adjusting eggs side by side rowwise so as to interlock, comprising a tray having two sides and one end closed and a bottom formed with grooves crosswise and discharge them sidewise through the open end of the said tray, in combination with a rail or movable end $d$ at the open end of the tray furnished with projections $e$ which protrude into the grooves or corrugations $c$ in alternate order, all substantially as and for the purpose set forth.

In witness whereof we have hereunto set our hands in presence of two witnesses.

ALFRED LYONS.
JAMES LYONS.
GEORGE LYONS.

Witnesses:
F. BOPHARDT,
STANLEY E. BRAMALL.